July 3, 1951 — J. BIRD — 2,559,493
DIAL STRUCTURE FOR WEIGHING APPARATUS
Filed Oct. 29, 1946 — 3 Sheets-Sheet 1
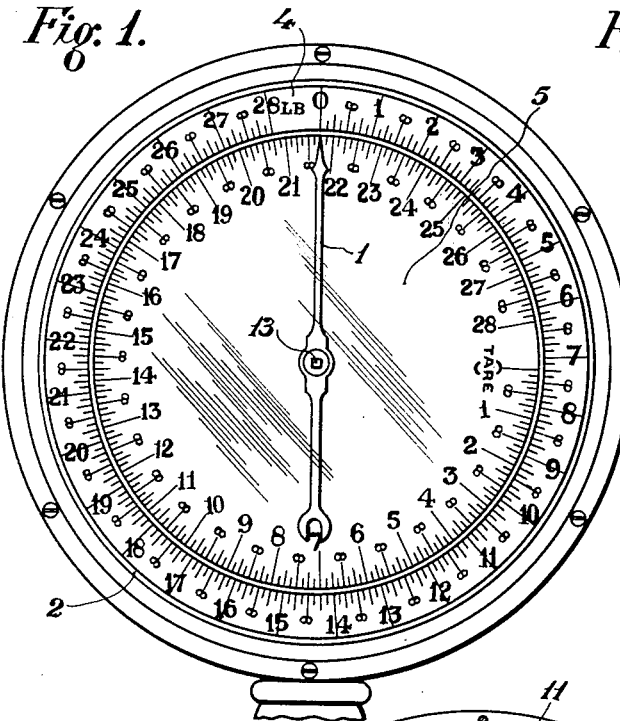
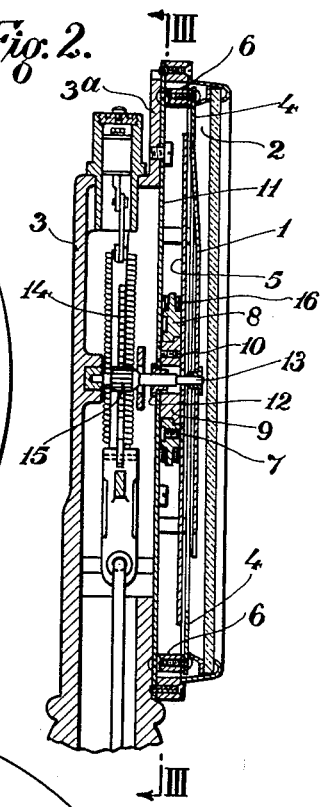
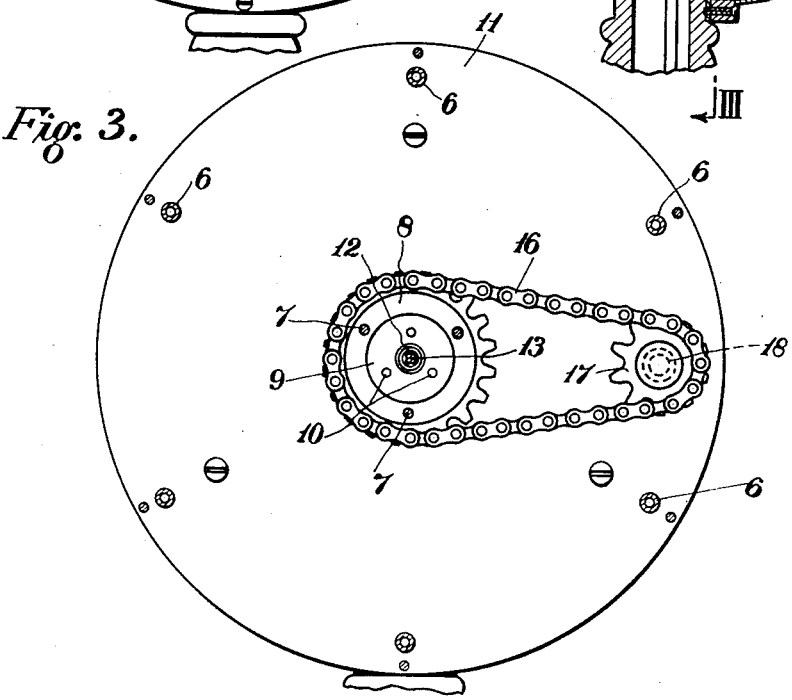
INVENTOR
JOHN BIRD
BY
Richards & Geier
ATTORNEYS July 3, 1951  J. BIRD  2,559,493
DIAL STRUCTURE FOR WEIGHING APPARATUS
Filed Oct. 29, 1946  3 Sheets-Sheet 2
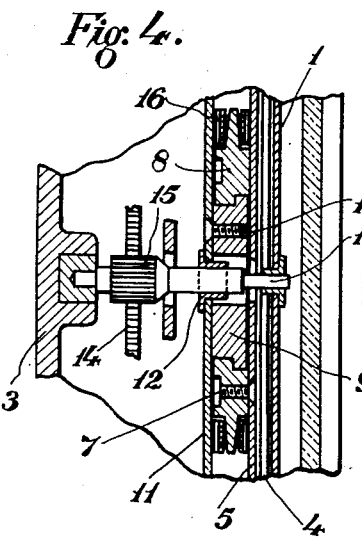
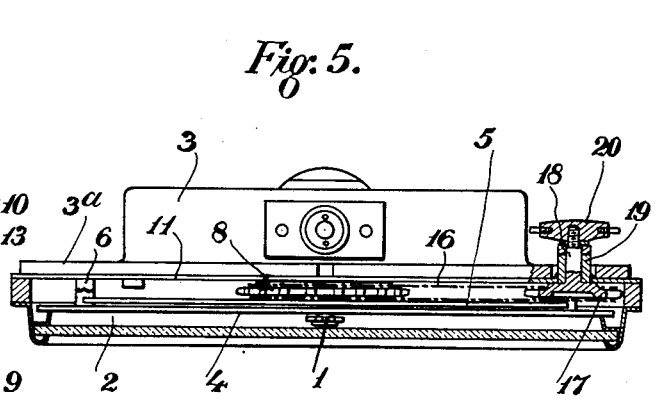
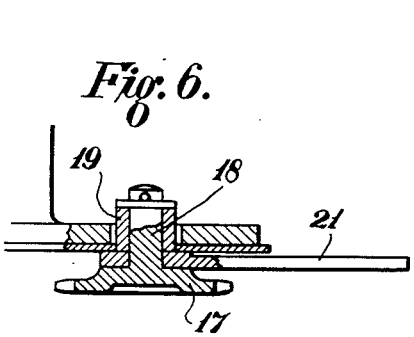
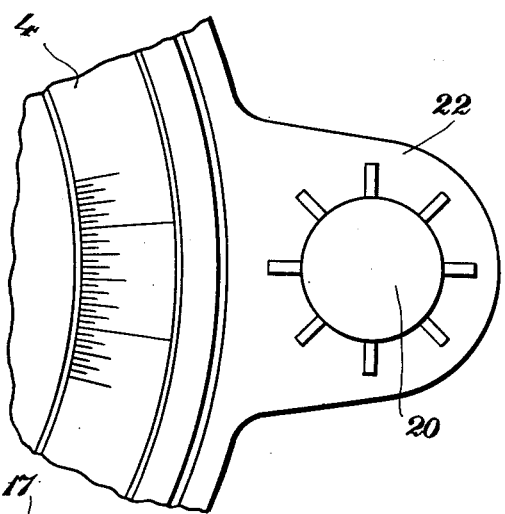
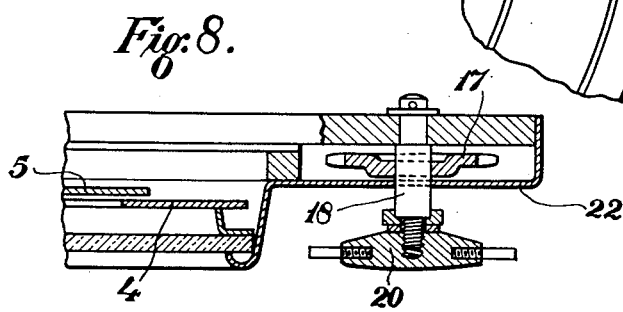
INVENTOR
JOHN BIRD
BY *Richards & Geier*
ATTORNEYS July 3, 1951 J. BIRD 2,559,493
DIAL STRUCTURE FOR WEIGHING APPARATUS
Filed Oct. 29, 1946 3 Sheets-Sheet 3

INVENTOR
JOHN BIRD
BY
Richards & Geier
ATTORNEYS

Patented July 3, 1951

2,559,493

UNITED STATES PATENT OFFICE 2,559,493

DIAL STRUCTURE FOR WEIGHING APPARATUS

John Bird, West Bromwich, England, assignor to George Salter and Company Limited, West Bromwich, England, a company of Great Britain Application October 29, 1946, Serial No. 706,313
In Great Britain February 25, 1944

Section 1, Public Law 690, August 8, 1946
Patent expires February 25, 1964

3 Claims. (Cl. 116—129)

This invention relates to the taring dials of weighing apparatus of the kind wherein the tare of a containing vessel is determined on a fixed dial or scale and the net weight of the contents of the vessel is determined on an auxiliary rotatably-adjustable dial or scale co-operating with the movable indicating pointer of the weighing apparatus the two dials or scales being arranged concentrically, one outside the other, and the pointer being located wholly in front of the inner dial, said dials being relatively rotatable, either the outer dial or the inner dial being fixed and the other being rotatable so that the zero marking of the rotatable dial may be made to coincide with the pointer when an empty container is weighed, the net weight of the contents of the subsequently filled container being then shown upon the movable dial by means of the pointer.

In one known construction the inner dial has been movable, and for operation it has been connected by radial arms to an outside rotatable ring mounted exteriorly to the outer fixed dial and operated by an arm or handle working in a slot in the casing of the machine. This construction has the disadvantages that the radial arms cross the fixed dial and may interfere with the readings thereof, and that dust or dirt can enter the slot in the casing through which the operating arm or handle works.

Other constructions have also been proposed in which a part for operating the movable dial crosses, and may interfere with the reading of, the fixed dial; whilst in taring apparatus wherein the pointer is behind the inner dial the latter has been operated by a central handle at the front, but such arrangement is not suitable for apparatus in which the pointer is located wholly in front of the inner dial.

The principal object of the present invention is to provide a taring dial construction or assembly of the kind referred to having improved means for adjusting the movable dial which does not involve a part which crosses the fixed dial, so that the readings thereof are not obscured; and which does not involve the movable dial being mounted on a glass or other transparent front cover.

According to the invention, in a weighing apparatus having taring dials of the kind referred to, the movable dial is rotatably mounted on a central bearing part and is driven through chain-and-sprocket gearing from a spindle located clear of the pointer-operating mechanism and operated by a handle or turning part conveniently located at the back, front or side of the machine.

Figure 1 of the accompanying drawings is a front elevation of the upper part of a platform weighing machine having a movable taring dial operated in accordance with the present invention.

Figure 2 is a vertical section through the said upper part of the machine.

Figure 3 represents a section on line III—III, Figure 2, showing the means for operating the movable dial.

Figure 4 is a vertical section on a larger scale through the middle portion of Figure 2.

Figure 5 is a horizontal section through a portion of the dial casing, showing the driving means.

Figure 6 represents a fragmentary section of a modification in which an operating handle is provided at the side.

Figure 7 is a front elevation and Figure 8 is a horizontal section illustrating another modification in which the handle is at the front.

Figure 9:
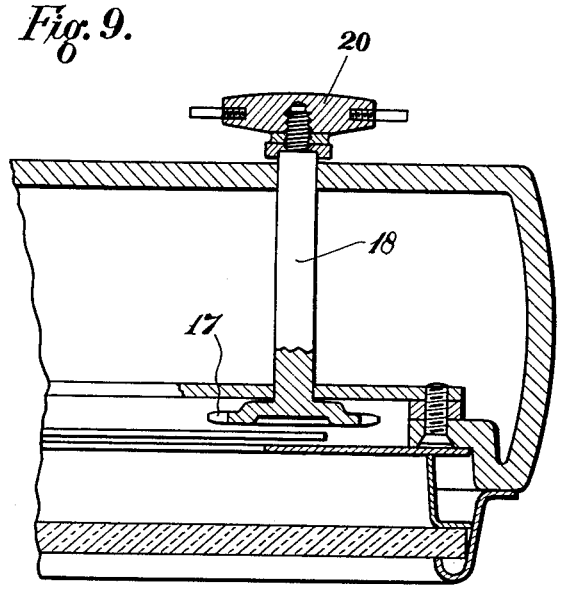
Figure 9 shows in horizontal section another form of the invention in which the handle is at the back.

Referring to Figures 1 to 5, which illustrate one embodiment of the invention in connection with a spring balance or weighing scale of the platform type, in which a pointer 1, operated by a platform at the base (not shown), moves over a compound taring dial assembly mounted within a circular dial chamber 2 attached to a casing or head 3 at the top of a column, the said taring dial assembly comprises a fixed outer annular dial 4 marked with gross weight indications around its face, and an inner circular dial 5 of smaller diameter which can be rotated relatively to the fixed dial 4, being also marked with weight indications around its face, adjacent its edge. The fixed annular dial 4 may, as shown, be attached by screws to spacing posts 6 carried by a flange portion 3ª of the casing 3 and it may lie in a plane in front of that of the movable dial 5 (as shown), or it may be in the same plane as that of dial 5.

The said movable dial 5 is in the form of a disc which has attached to its rear face, by screws 7, a toothed sprocket wheel 8, having a stepped bore, mounted to turn freely around a bearing ring 9 secured by screws 10 to a back plate 11 that closes the rear of the dial chamber 2. This back plate 11 is attached to the flange portion 3ª of the casing and carries at its centre the usual fixed bearing bush 12 that supports the pointer spindle 13, said spindle being operated from the platform by rack-and-pinion mechanism 14, 15, contained within the casing 3. The pointer 1 fixed upon the spindle 13 extends over the movable dial 5 to the inner edge of the fixed dial 4. The sprocket wheel 8 serves as a bearing sleeve for rotatably supporting the dial 5 upon the bearing ring 9.

In use, an empty container is placed upon the platform, causing the pointer to move to a certain angular position to show the weight on the outer dial 4. The inner dial 5 is then rotated until its zero mark coincides with the pointer. The net weight of any material then put into the container is shown on the inner dial and the gross weight on the outer dial. Similarly the net weight can be ascertained, when a full container is placed on the platform, by rotating the inner dial so that its zero point coincides with the known tare weight on the outer dial.

In order to rotate the inner dial 5, the sprocket wheel 8 on its back face is driven by a chain 16 from another sprocket wheel 17 fixed upon a horizontal spindle 18 which extends rearwardly through the flange portion 3ª of the casing, being rotatably mounted in a bearing bush 19 on back plate 11 and having an external hand-wheel 20 (Figure 4) fixed upon its rear end. When this hand-wheel is turned, the inner dial 5 is rotated through the chain and sprocket gearing. Instead of a hand-wheel 20, an external head or boss may be fitted, having holes in it whereby it may be turned by means of a tommy-bar. Or a lever handle or other operating device may be fitted to the spindle.

In the modification represented in Figure 6, the sprocket wheel 17 is carried by a spindle 18 turning in a bearing bush 19, as in Figure 4, but the said spindle is turned by means of a lever handle 21 fixed upon it and extending from the side of the machine, such as through a slot in the edge of the dial casing (not shown). The ratio of the chain gearing would be such as to give the desired movement of the dial by the permitted angular movement of the handle.

In the further form of the invention shown in Figures 7 and 8, the operating hand-wheel 20 (or other device) is disposed at the front of the machine, being carried by a spindle 18 fixed to the sprocket wheel 17 and rotatably mounted in a laterally-extending lug 22 at one side of the head of the machine. By turning the wheel 20 the dial 5 may be rotated relatively to the fixed dial 4.

If, as shown in Figure 9, the head or casing 3 of the machine is of uniform thickness across its entire diameter, then the spindle 18 carrying the sprocket-wheel 17 can pass out through the back of the casing, as shown, being fitted at its rear end with an exterior hand-wheel 20 or other operating device, and being disposed well to one side of the pointer mechanism.

Instead of employing a chain drive, as in Figures 1 to 9, any other form of mechanical gearing may be used, but a positive drive is preferred.

If desired, the inner dial may be fixed and the outer dial rotated to show net weights, being mounted to turn about a central bearing part and being operated by any of the means hereinbefore described.

I claim:

1. A weighing apparatus for weighing material in a container and comprising a casing, a fixed dial therein having gross weight indications thereon, a rotatable dial in the casing having net weight indications thereon, said two dials being arranged concentrically one within the other, a movable indicating pointer mounted to turn about the same axis of rotation as the rotatable dial and being located wholly in front of and being movable over the inner dial in readable relation to the weight indications on both dials, a fixed central bearing part in the casing for supporting the movable dial, a rotatable spindle supported by the casing in radially-spaced relation to the central bearing part, a turning device fixed thereon, a sprocket wheel on the spindle, a sprocket wheel fixed to the movable dial, and a chain connecting the two sprocket wheels.

2. A weighing apparatus for weighing material in a container and comprising a casing, a fixed partition plate dividing the interior of the casing to form a front dial chamber, a fixed dial in said dial chamber having gross weight indications thereon, a central bearing part fixed on the front of said partition plate, a rotatable dial rotatably mounted on said bearing part and having net weight indications thereon, the two dials being arranged concentrically one within the other, a movable indicating pointer mounted to turn about the same axis of rotation as the rotatable dial and being located in front of and being movable over the inner dial in readable relation to the weight indications of both dials, mechanism located within the casing behind the partition plate for operating the pointer, a rotatable spindle mounted in a wall of the casing in radially-spaced relation to the central bearing part and clear of the pointer operating mechanism, a turning device fixed on said spindle, a sprocket wheel on the spindle, a sprocket wheel fixed to the movable dial, and a chain connecting the two wheels, the wheels and chain being located behind the movable dial.

3. A weighing apparatus for weighing material in a container comprising a casing, a fixed dial having gross weight indications thereon, a rotatable dial having net weight indications thereon, said two dials being arranged concentrically one within the other, a movable indicating pointer mounted to turn about the same axis of rotation as the rotatable dial and located in front of the inner dial, in readable relation to the weight indications on both dials a fixed central bearing part, a sprocket wheel fixed to the back of the movable dial and rotatably supported upon the bearing part, a spindle rotatably mounted in the casing, a handle fixed on the spindle outside the casing, a sprocket wheel on the spindle within the casing, and a chain connecting the two sprocket wheels, being located within the casing and behind the movable dial.

JOHN BIRD.

REFERENCES CITED

The following references are of record in the file of this patent:

UNITED STATES PATENTS

| Number | Name | Date |
|---|---|---|
| 2,152,635 | Crane et al. | Apr. 4, 1939 |

FOREIGN PATENTS

| Number | Country | Date |
|---|---|---|
| 267,214 | Great Britain | Mar. 9, 1927 |
| 339,264 | Great Britain | Dec. 3, 1930 |
| 575,951 | Great Britain | Feb. 25, 1944 |